United States Patent [19]
Oikawa et al.

[11] Patent Number: 5,097,807
[45] Date of Patent: Mar. 24, 1992

[54] COMBUSTION CHAMBER FOR DIESEL ENGINES

[75] Inventors: Hiroshi Oikawa; Naohisa Nakashima, both of Tokyo; Minoru Matsui; Tadao Ozawa, both of Nagoya, all of Japan

[73] Assignees: Mitsubishi Motors Corporation, Tokyo; NGK Insulators, Ltd., Aichi, both of Japan

[21] Appl. No.: 678,180

[22] Filed: Mar. 29, 1991

Related U.S. Application Data

[63] Continuation of Ser. No. 227,802, Aug. 3, 1988, abandoned.

[30] Foreign Application Priority Data

Aug. 12, 1987 [JP] Japan ................ 62-200059

[51] Int. Cl.$^5$ ............................. F02B 23/06
[52] U.S. Cl. ......................... 123/276; 123/668
[58] Field of Search ........... 123/657, 668, 669, 193 R, 123/193 CH, 193 H, 276, 279

[56] References Cited

U.S. PATENT DOCUMENTS

| | | | |
|---|---|---|---|
| 3,408,995 | 11/1968 | Johnson | 123/668 |
| 4,074,671 | 2/1978 | Pennila | 123/668 |
| 4,344,390 | 8/1982 | Heydrich et al. | 123/669 |
| 4,532,896 | 8/1985 | Nakahara et al. | 123/668 |
| 4,774,926 | 10/1988 | Adams | 123/193 H |
| 4,796,572 | 1/1989 | Heydrich | 123/668 |

FOREIGN PATENT DOCUMENTS

| | | | |
|---|---|---|---|
| 2439806 | 3/1976 | Fed. Rep. of Germany | |
| 1182853 | 6/1959 | France | |
| 2089242 | 1/1972 | France | |
| 60-30451 | 2/1985 | Japan | 123/669 |
| 60-90955 | 5/1985 | Japan | 123/668 |
| 61-218715 | 9/1986 | Japan | 123/668 |
| 579616 | 8/1946 | United Kingdom | |
| 2061383 | 5/1981 | United Kingdom | 123/668 |

*Primary Examiner*—Andrew M. Dolinar
*Attorney, Agent, or Firm*—Parkhurst, Wendel & Rossi

[57] ABSTRACT

The disclosure relates to a novel arrangement of a combustion chamber for diesel engines, which is defined by an inner wall including a fuel-impinging area formed of a metallic material, and a remaining area which at least partly is formed of a ceramic material or a like heat-resisting material. The arrangement serves to achieve an effective exhaust gas clarification, including the minimization of NOx emission, and to realize increased power output and reduced fuel consumption of the engine.

19 Claims, 14 Drawing Sheets

FIG_1

FIG_3

FIG_6
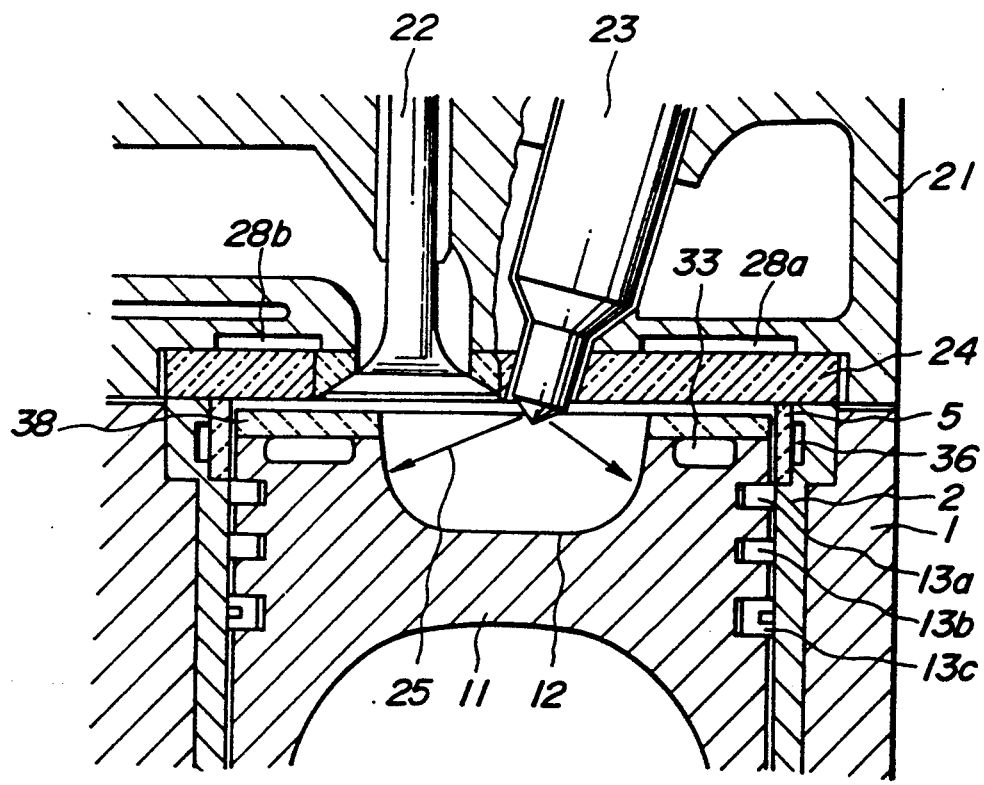

FIG_7A
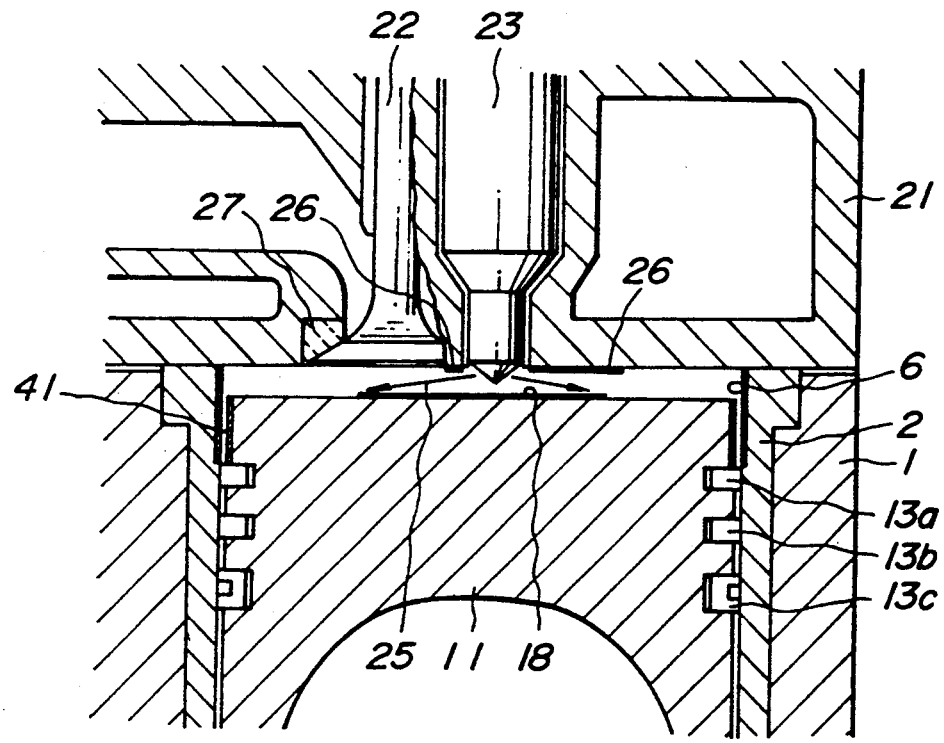
FIG_7B
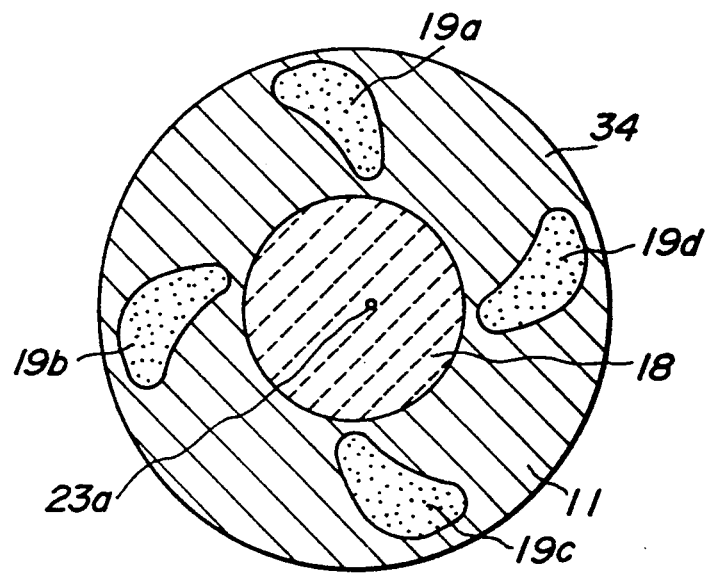

FIG_8
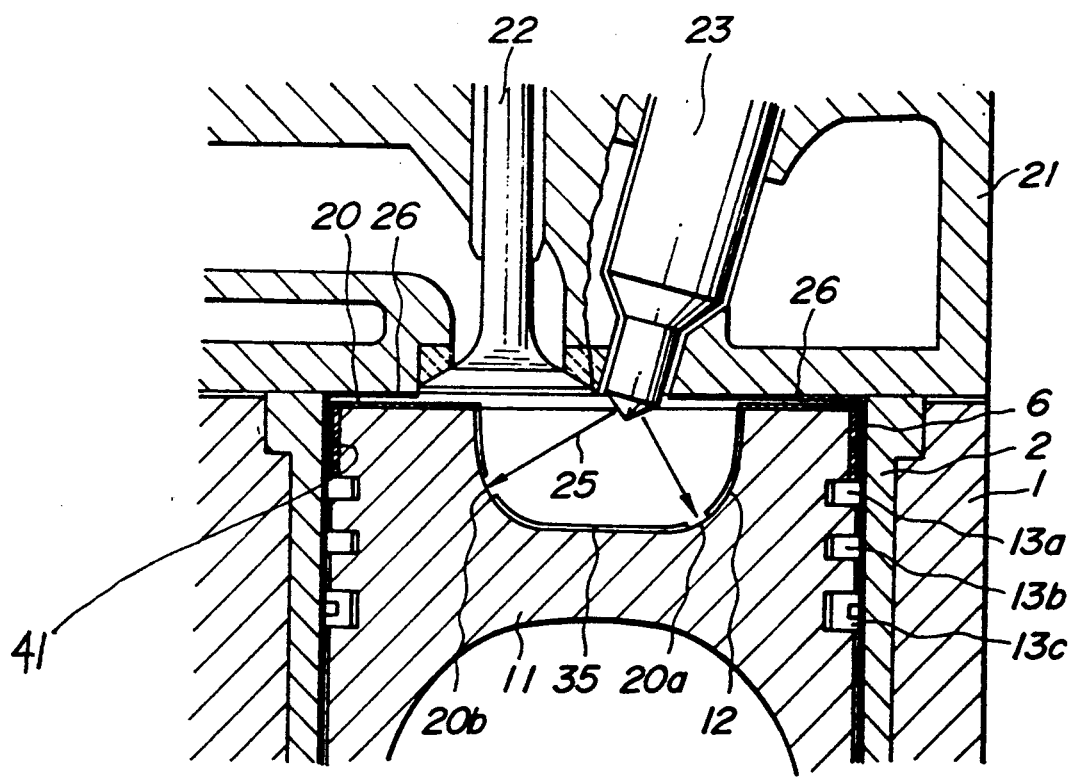

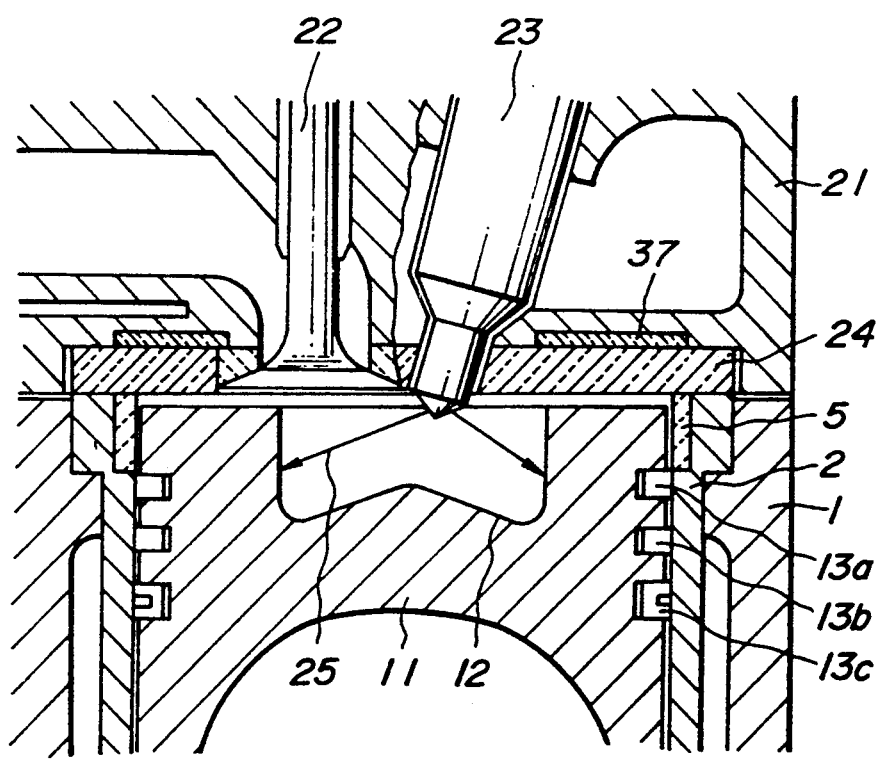
FIG_9

FIG_10A
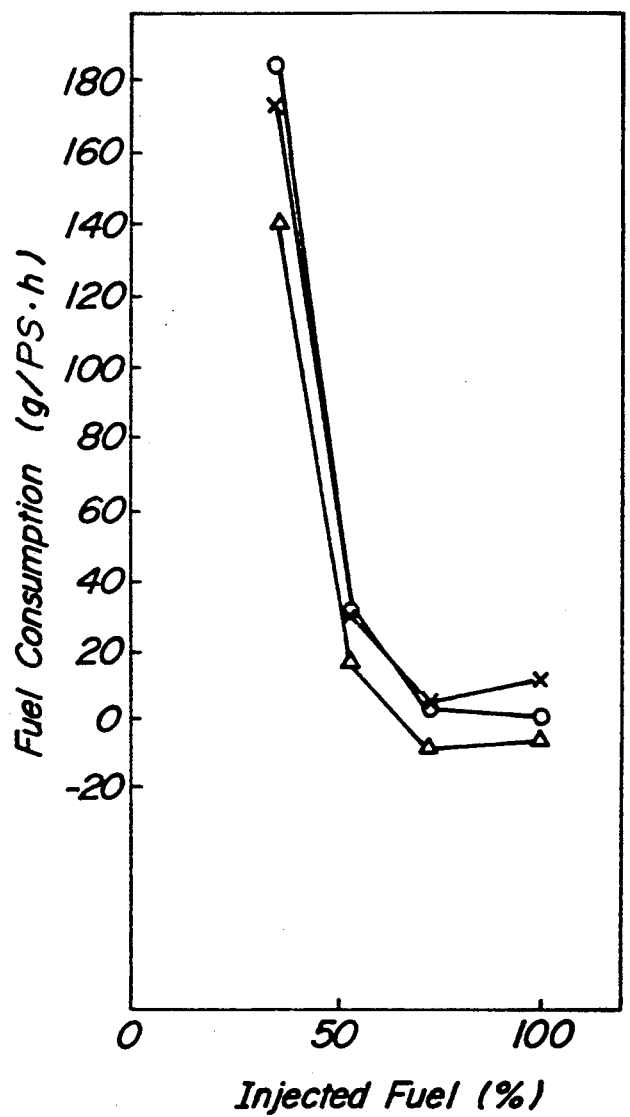

FIG_10B
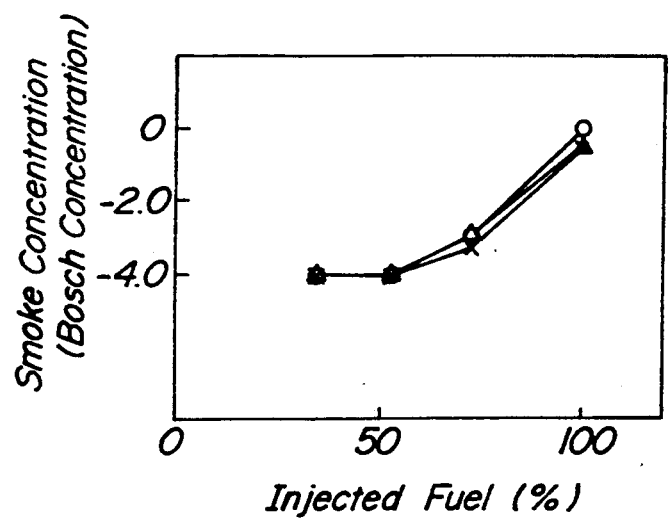
FIG_10C
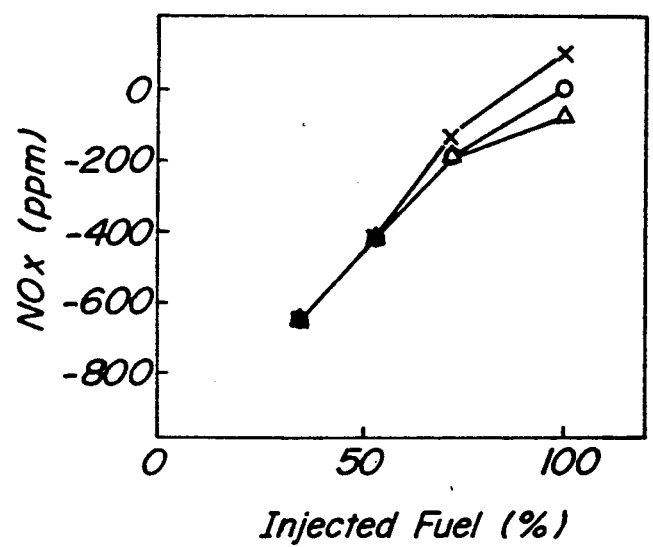

FIG_10D
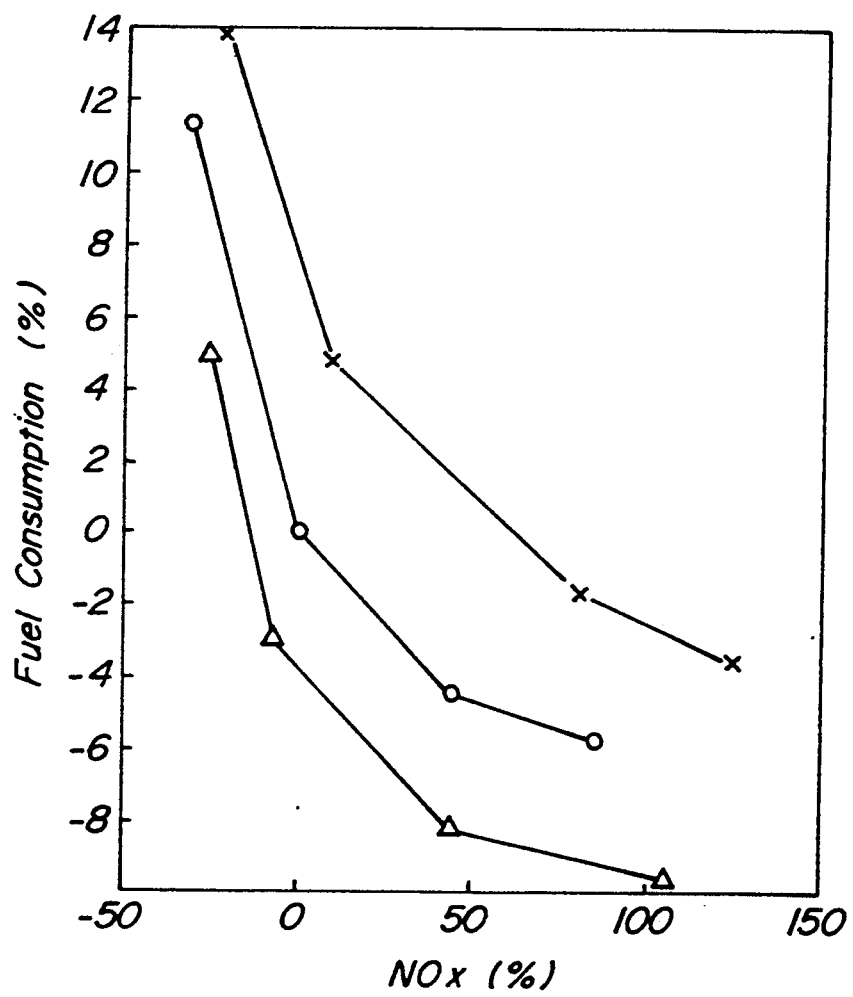

FIG_10E
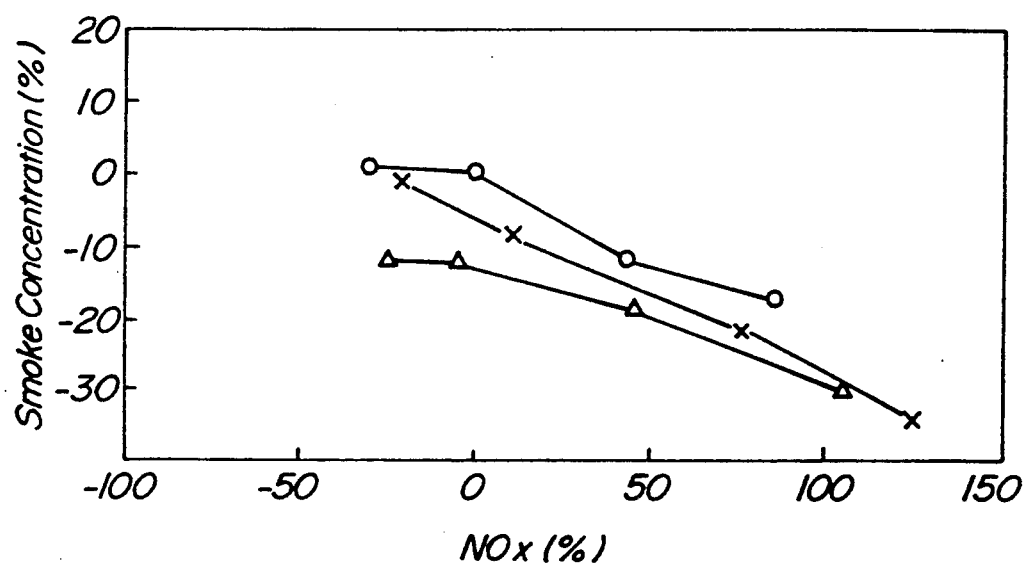

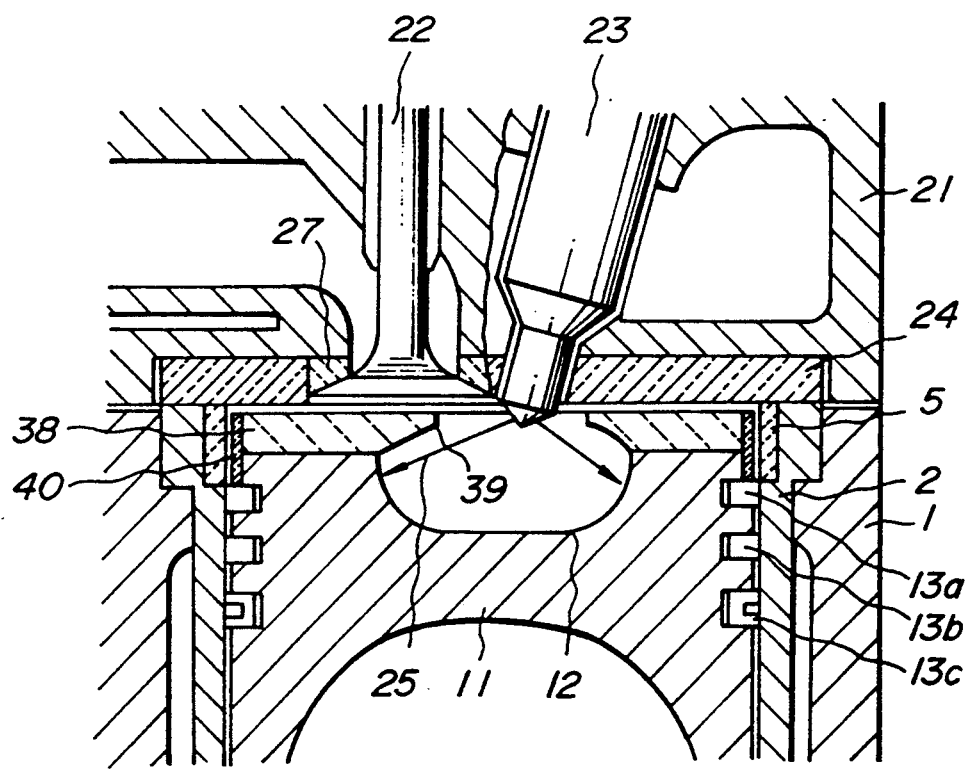
FIG_11

COMBUSTION CHAMBER FOR DIESEL ENGINES

This ia a continuation of application Ser. No. 07/227,802 filed Aug. 3, 1988, now abandoned.

BACKGROUND OF THE INVENTION

1. Field of the Invention

The present invention relates to a combustion chamber for diesel engines; more particularly, it pertains to a combustion chamber for diesel engines with an inner wall which is formed at least partly of a heat-resisting material, such as ceramic material, to realize a higher operation temperature of the engine.

2. Description of the Related Art

Heretofore, there have been various proposals regarding diesel engines, which are directed to effective achievement of the improved fuel consumption, improved fuel ignitionability, increased power output, as well as clarification of the exhaust gas. Among others, such proposals include the provision of a combustion chamber into which the fuel spray is injected from an injection nozzle and of which at least the fuel-impinging area, i.e. that area of the combustion chamber inner wall which is impinged upon by the injected fuel, is formed of ceramic material or a like heat-resisting material to raise the operation temperature of the engine.

More particularly, for diesel engines in which the fuel spray is injected toward the combustion chamber inner wall, it is known to use a heat-resisting material to form the fuel-impinging area of such an inner wall. Also, for diesel engines having a piston head portion with a cavity into which the fuel spray is injected, it is similarly known to use a heat-resisting material to form at least the fuel-impinging area of the cavity. Such a state of the art is disclosed, e.g. in Japanese Utility Model Application Laid-open Publication Nos. 59-58,735; 59-111,918; 60-178,345; and 61-105,721.

However, none of the above-mentioned proposals are considered practical or a satisfactory approach, owing to the technical difficulties as follows.

First of all, due to the use of a heat-resisting material to form the fuel-impinging area of the combustion chamber inner wall, such area is maintained at a considerably high temperature during the operation of the engine. Thus, the combustion of the fuel begins prematurely, as soon as the fuel-impinging area is impinged upon by the injected fuel, so that the combustion region of the chamber is excessively heated, accompanying an increased NOx emission in the exhaust gas. These problems are still more serious when the heat-resisting material is used to form at least the fuel-impinging area on the inner wall of the cavity in the piston head, the volume of which is very small and which is thus more significantly heated.

Secondly, the ignition delay time available in the prior art arrangement is extremely shortened, so that it becomes difficult to achieve an adequate mixture of the injected fuel spray with oxygen. This results in undesirable degradation of the initial combustion property and, hence, in decreased power output as well as increased fuel consumption of the engine.

SUMMARY OF THE INVENTION

Therefore, it is a principal object of the present invention to provide an improved combustion chamber for diesel engines, which makes it possible to reduce the above-mentioned drawbacks of the prior art, to minimize NOx emission in the exhaust gas, and to realize an increased power output and a decreased fuel consumption.

To this end, according to the present invention, there is provided a combustion chamber for diesel engines, which is defined by an inner wall including a fuel-impinging area formed essentially of metallic material, and a remaining area which, at least partly, is formed essentially of a heat-resisting material.

The term "combustion chamber", as used herein designates a closed space which is defined within the cylinder by wall surfaces between the cylinder head and the piston top ring at the top dead center of the piston, including the inner surface of the cylinder liner, the outer surface of the piston and the lower surface of the cylinder head surrounding the closed space. The term "combustion chamber inner wall", as used herein designates walls which surround the closed space of the combustion chamber. Here, the combustion chamber does not include the surfaces of intake and exhaust valves, valve seats, as well as fuel injection nozzles. Usually, these elements are already formed to have a sufficient heat resistivity; however, may be formed of ceramic material or a like heat-resisting material, if necessary.

In the above-mentioned arrangement of the present invention, the fuel-impinging area is formed of a metallic material, such as aluminum alloy or cast iron with excellent heat conductivity, and is thus maintained at a relatively low temperature as contrasted with use of a heat-resisting material having a relatively poor heat conductivity. Thus, a greater part of heat generated by combustion of the fuel can be effectively conducted, through the metallic material of the fuel-impinging area, to various internal structural elements of the engine surrounding the combustion chamber. As a result, the combustion region around the fuel-impinging area within the chamber can be maintained at a relatively low temperature, which makes it possible to significantly reduce the undesirable NOx emission component in the exhaust gas.

With the above-mentioned arrangement of the present invention, furthermore, an adequate ignition delay time is maintained in which the fuel can be efficiently mixed with oxygen, making it possible to realize an adequate initial combustion. Additionally, because a heat-resisting material is used to form at least part of the remaining area of the combustion chamber inner wall, i.e. that area which is not impinged upon by the injected fuel spray, it becomes possible to maintain such remaining area at a relatively high temperature during the operation of the engine. Consequently, an adequate main combustion can be performed within a shortened period as compared with the main combustion achieved by the prior art arrangement, and this results in increased power output and decreased fuel consumption of the engine.

In conventional diesel engines wherein a heat-resisting material is not used to form the combustion chamber inner wall, except the fuel-impinging area and/or cavity in the piston head, the maximum temperature of the combustion chamber inner wall in the full-load condition of the engine is limited to approximately 400° C. In contrast, use of the heat-resisting material for such combustion chamber inner wall, according to the present invention, makes it possible to raise the maximum temperature of the inner wall to at least 450° C., to thereby effectively achieve the above-mentioned improvements. By raising the maximum temperature of the combustion chamber inner wall to a preferred range of 500° C. or more, and to a further preferred range of 550° C. or more, the above-mentioned improvements can be achieved even more significantly.

The combustion chamber according to the present invention may be advantageously applied to both super- or turbo-charged diesel engines and naturally aspirated diesel engines. Still, the improvements achieved by the present invention are more significant in naturally aspirated diesel engines, wherein a smaller amount of intake air is available to the same quantity of injected fuel, and the intake air thus has to be used more efficiently.

GENERAL DESCRIPTION OF THE INVENTION

As mentioned above, according to the present invention, the inner wall of the combustion chamber for diesel engines includes a fuel-impinging area which consists essentially of a metallic material. Such metallic material may be aluminum alloy, cast iron or steel.

The heat-resisting material which is used to form the remaining area of the combustion chamber inner wall may be a heat-resisting metal, a ceramic material with a heat insulating property, or combination thereof.

In this connection, the heat-resisting metal may be nickel- or cobalt-based super-alloy, stainless steel, heat-resisting cast steel, or combination thereof. On the other hand, the ceramic material to be used may be in the form of a ceramic sintered body, a ceramic coated layer, or combination thereof. The ceramic sintered body may consist of silicon nitride, sialon, partially stabilized zirconia, mulite, alumina, silicon carbide, or combination thereof. The ceramic coated layer, in turn, may consist of zirconia, chromium oxide, silicon nitride, silicon carbide, mulite, alumina, sialon, or combination thereof, and may be formed by various processes, e.g. flame spray process, plating process, CVD process or PVD process.

When using the ceramic coated layer, the coated layer should have a sufficient thickness in order that the combustion chamber inner wall can be heated to such a high temperature level that the improvement achieved by the present invention can be significantly recognized. However, the ceramic coated layer with an increased thickness often suffers from a tendency that thermal deformation or thermal stress, to which the coated layer is subjected, results in crack formation in the layer or in separation of the layer; hence, a particular attention has to be paid to avoid such problems.

The present invention may be advantageously applied to a diesel engine whose piston head is formed with a cavity, in such a manner that at least the fuel-impinging area of the cavity inner wall, or the entire cavity inner wall is formed of a metallic material. By this, the combustion region around the fuel-impinging area can be maintained, during the operation of the engine, at a relatively low temperature which not only serves to reduce the NOx emission, but also provides increased power output and decreased fuel consumption of the engine, both achieved by an adequate ignition delay time and the resultant adequate initial combustion.

In this connection, the improved fuel combustion can be considered due to the utilization of an increased amount of oxygen for combustion. That is, the combustion region near the cavity inner wall during the operation of the engine is maintained at a relatively low temperature, as mentioned above, which corresponds to a relatively high density of the intake air and, hence, to a relatively high density of oxygen. Also, use of the heat-resisting material to form at least part of the lower surface of the cylinder head and/or at least part of the upper surface of the piston head results in that the combustion chamber inner wall, except the cavity wall, is maintained at a higher temperature during the operation of the engine in contrast with relatively low temperature of the cavity wall. Thus, the intake air within the combustion chamber, except the cavity, has a relatively low density as compared with the cavity, which means that the intake air within the cavity has a relatively high density as compared with the remainder of the combustion chamber.

Moreover, use of the heat-resisting material to form at least part of the lower surface of the cylinder head and/or at least part of the upper surface of the piston head also results in a promoted combustion of the fuel after ignition, since the combustion chamber inner wall excluding the cavity inner wall can be maintained at a relatively high temperature in contrast with use of a conventional metallic material. This, too, serves to achieve the improved power output, minimization of the combustion period, improved fuel consumption, as well as clarification of exhaust gas.

Moreover, the heat-resisting material is advantageously used to form at least part of the inner surface of the cylinder liner and/or at least part of the outer peripheral surface of the piston top land, thereby to further improve the heat resistivity of the combustion chamber inner wall. By this, it is possible to maintain the combustion chamber inner wall at a still higher temperature during the operation of the engine, and to more effectively achieve the improved power output and fuel consumption, as well as the exhaust gas clarification.

Preferably, the heat-resisting material forms at least part of the cylinder liner inner surface, and extends from the top end of the cylinder liner by an axial length of 5 mm or more. Such a limitation imposed on the heat-resisting material is based on a recognition that, with an axial length of less than 5 mm of that portion of the cylinder liner inner surface, which is formed of the heat-resisting material, the combustion chamber inner wall cannot be maintained at a higher temperature during the operation of the engine, and it becomes difficult to significantly improve the fuel consumption and to achieve a satisfactory clarification of the exhaust gas.

In the present invention, the surface area ratio of the heat-resisting material portion to the combustion chamber inner wall, i.e. the ratio of the area of the heat-resisting material with respect to the total surface area of the chamber, except the cavity and/or fuel-impinging area, plays an important role. That is, a higher surface area ratio of the heat-resisting material portion results in a more improved heat resistivity of the combustion chamber, whereby the chamber can be maintained at a relatively high temperature during the operation of the engine. Thus, it is possible to effectively achieve the increased power output, reduced fuel consumption, as well as improved exhaust gas clarification. The surface area ratio of the heat-resisting material should be at least 20%, is preferably at least 40%, and is more preferably at least 70%. For such an arrangement also, the entire cavity inner wall may be formed of metallic material, or the cavity inner wall except the fuel-impinging area may be at least partly formed of a heat resisting material.

The above-mentioned limitation of the surface area ratio imposed on the heat-resisting material is based on the following recognitions. That is, the surface area ratio below 20% does not significantly improve the heat resistivity of the combustion chamber, does not permit the combustion chamber inner wall to be maintained at a higher temperature during the operation of the engine, and does not achieve sufficient improvement in the fuel consumption and the exhaust gas clarification. On the other hand, as will be apparent from the examples to be explained hereinafter, the surface area ratio of 40% or more makes it possible to achieve sufficient improvement in the fuel consumption and exhaust gas clarification, and even more remarkable improvement can be achieved in case of the surface area ratio of 70% or more, due to the resultant improvement in the heat resistivity and a much higher temperature of the combustion chamber inner wall during the operating condition.

Preferably, the heat-resisting material member forming part of the combustion chamber inner wall is surrounded at least partly by a heat insulating air layer, or by a heat insulating member with the heat conductivity of no greater than 0.02 cal/cm.s.°C., which may thus be ceramics, such as cordierite, mullite, alumina, zirconia or the like, or an appropriate composite material. Such heat insulating means more effectively prevents the heat loss as a result of heat transfer from the combustion chamber inner wall, and thus maintains the combustion chamber at a higher temperature during the operation of the engine, thereby to achieve further improvement in the fuel consumption of the engine as well as the exhaust gas clarification.

BRIEF DESCRIPTION OF THE DRAWINGS

FIGS. 3 to 6 are sectional views of various combustion chambers according to another embodiments of the present invention;

FIGS. 7A and 7B are sectional view and plan view of the combustion chamber according to another embodiment of the present invention, respectively;

FIGS. 8 and 9 are sectional views of the combustion chamber according to another embodiments of the present invention;

FIGS. 10A to 10E are graphs showing various characteristics of the combustion chamber of the present invention; and FIG. 11 is a sectional view of the combustion chamber according to still another embodiment of the present invention.

DETAILED DESCRIPTION OF THE PREFERRED EMBODIMENT

The present invention will now be explained in further detail, by referring to some preferred embodiments shown in the accompanying drawings.

Figure 1:
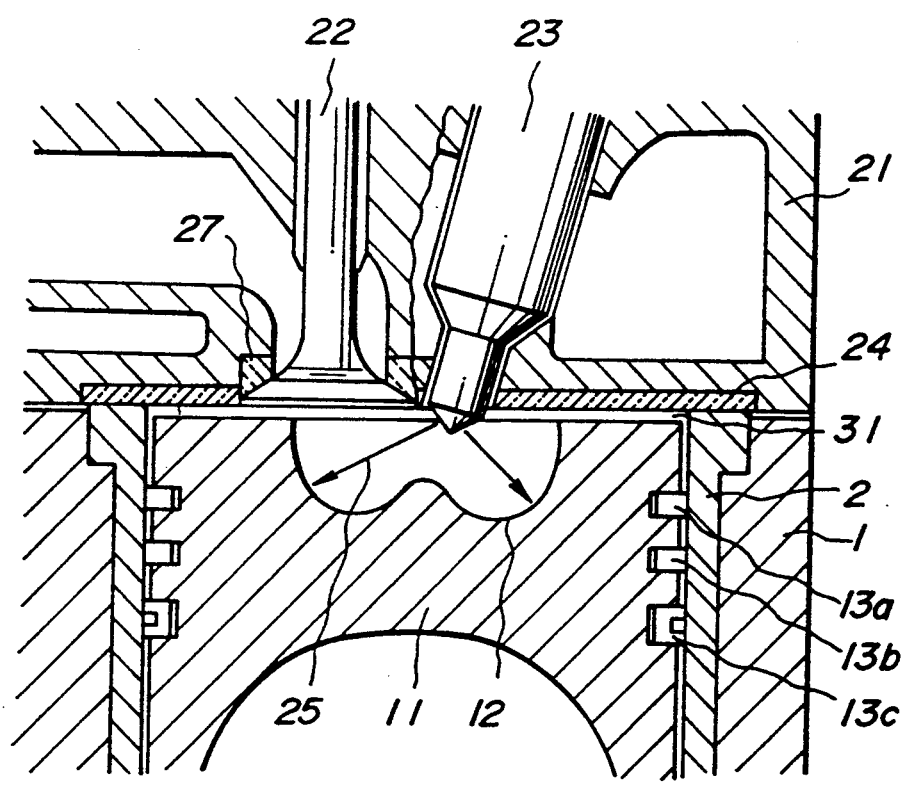
FIG. 1 is a sectional view of a combustion chamber for diesel engines, according to one embodiment of the present invention.

There is shown, in FIG. 1, a first embodiment of the combustion chamber according to the present invention which is applied to a direct injection type diesel engine. The engine includes a cylinder block 1 formed of a cast iron, and a cylinder liner 2 also formed of a cast iron which is fitted into the cylinder block 1. The engine also includes a piston 11 which is slidably arranged within the cylinder liner 2 for reciprocating motion. The piston 11 is formed of an aluminum alloy, and has a piston head which is formed with a cavity 12, and a plurality of circumferential grooves for accommodating piston rings 13a, 13b, 13c which are maintained in sliding contact with the inner surface of the cylinder liner 2 during the operation of the engine. The piston 11 is shown in FIG. 1 as being at a top dead center position. The engine further includes a cylinder head 21 with intake and exhaust valves 22 and corresponding valve seats 27, as well as a fuel injection nozzle 23, all of which are directed toward the piston head.

The combustion chamber 31 of the engine is defined by walls within the cylinder between the cylinder head 21 and the piston top ring 13a at the top dead center position of the piston 11, i.e. the inner surface of the cylinder liner 2 and the outer surface of the piston 11, as well as the lower surface of the cylinder head 21. In the present embodiment, the entire cavity 12 of the piston 11, including those areas upon which impinges the fuel spray 25 injected from the fuel injection nozzle 23, is formed of aluminum alloy. Furthermore, the lower surface of the cylinder head 21, except the intake and exhaust valves 22 and the fuel injection nozzle 23, is formed of a sintered ceramic body 24 of partially stabilized zirconia.

In the above-mentioned arrangement of the combustion chamber, use of the aluminum alloy to form the fuel-impinging area of the cavity 12 in the piston head serves to effectively prevent the combustion region of the fuel-impinging area from being excessively heated, thereby to significantly reduce the NOx emission in the exhaust gas. Moreover, use of the sintered ceramic body 24 of partially stabilized zirconia to form the lower surface of the cylinder head 21 serves to effectively maintain the combustion chamber inner wall, except the cavity inner wall, at a relatively high temperature which makes it possible to achieve significantly increased power output and reduced fuel consumption of the engine.

Figure 2:
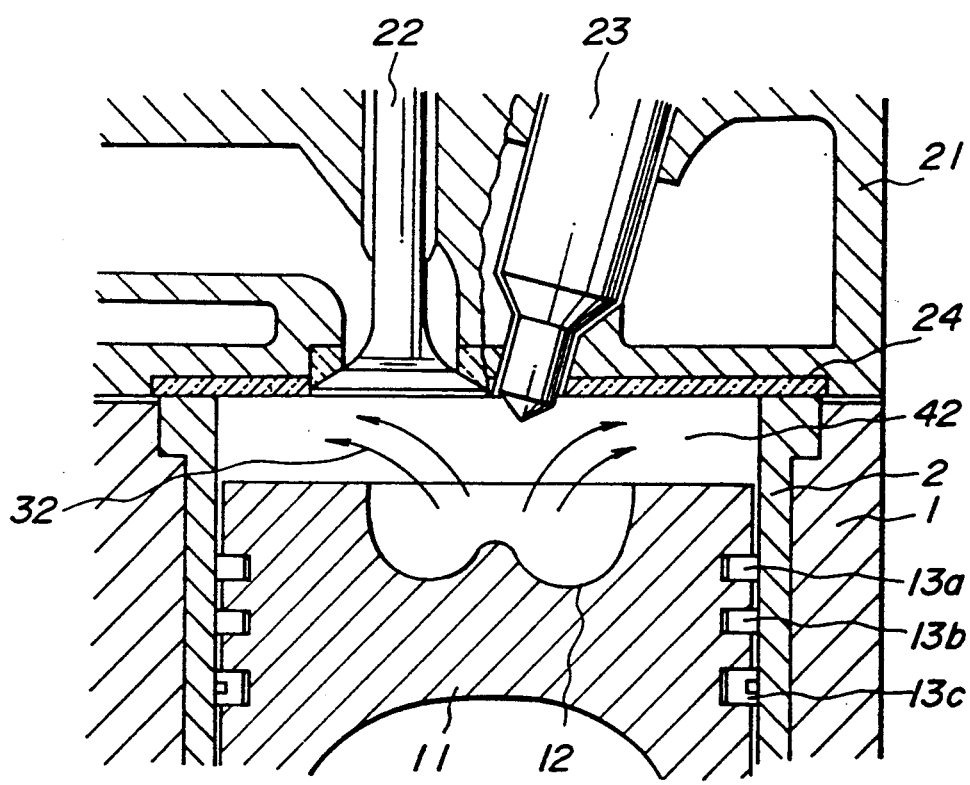
FIG. 2 is a sectional view showing the combustion chamber of FIG. 1, with the piston slightly displaced downwardly.

The fuel spray 25 injected into the combustion chamber 31 is ignited in the compressed state in which the piston 11 is substantially at its top dead center position as shown in FIG. 1. When, as a result of initial combustion of the fuel, the clearance 42 between the upper surface of the piston 11 and the lower surface of the cylinder head 21 becomes greater, as shown in FIG. 2, the combustion gas 32 already subjected to the initial combustion and a resultant expansion within the cavity 12 spouts strongly into the clearance 42, accompanying a simultaneous discharge of the unburnt fuel from the cavity 12. Thus, in conjunction with the swirl applied to the intake air during the suction stroke, the mixture of the unburnt fuel with the intake air is effectively promoted. Moreover, the clearance 42 is maintained at a high temperature due to the provision of the sintered ceramic body 24. Consequently, not only an improved combustion can be maintained, but also it becomes possible to shorten the combustion period, and to achieve increased power output, reduced fuel consumption, as well as effective clarification of the exhaust gas.

Figure 3:
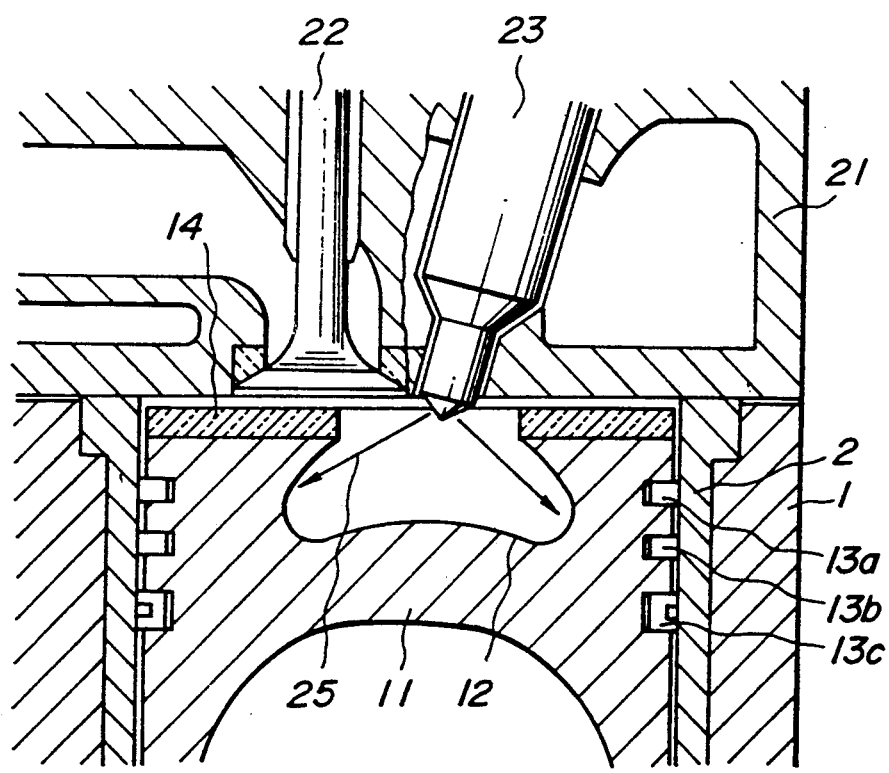

A second embodiment of the present invention is shown in FIG. 3 wherein the same reference numerals are used to denote the same or functionally equivalent elements, for which overlapping explanations are omitted for the sake of simplicity. In the present embodiment, the upper surface of the piston head of the piston 11 as well as a portion of the cavity 12 are formed of the sintered ceramic body 14 of silicon nitride, while the lower surface of the cylinder head 21 is formed of cast iron. The cavity 12 in the piston head has the impinging area for the injected fuel spray 25, which is formed of aluminum alloy with an excellent heat conductivity, and which is thus effectively prevented from being excessively heated. Moreover, use of the sintered ceramic body 14 of silicon nitride to form the piston head upper surface makes it possible to maintain the combustion chamber inner wall, except the cavity 12, at a high temperature. Thus, by this embodiment also, it is possible to minimize the NOx emission and to achieve increased power output, reduced fuel consumption, as well as effective clarification of the exhaust gas.

Figure 4:
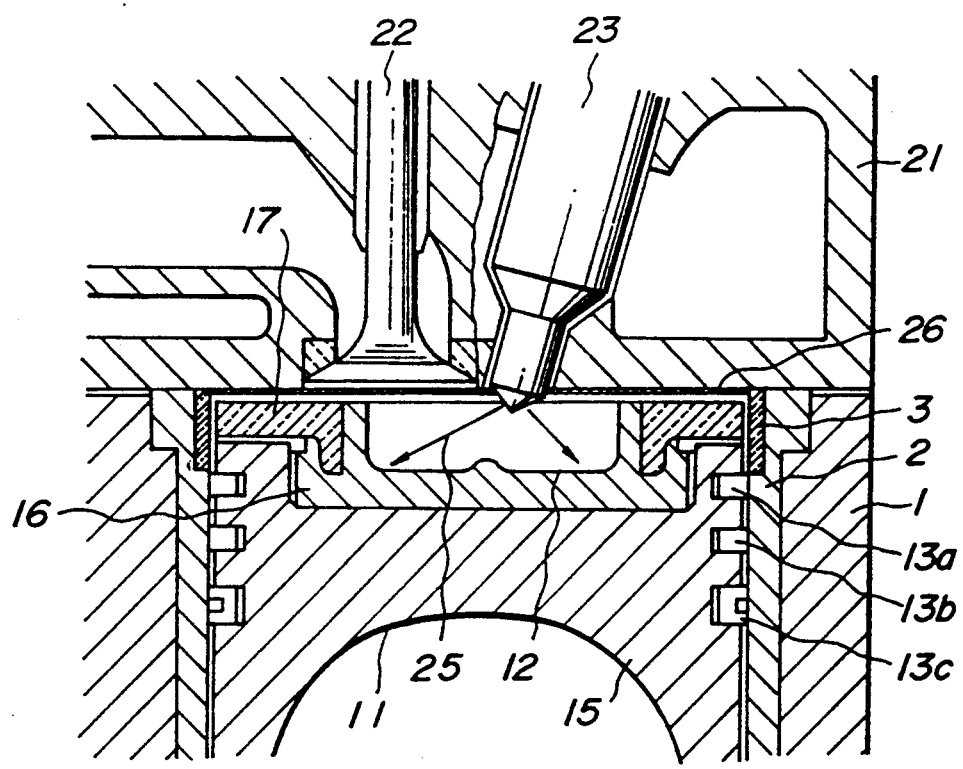

A third embodiment of the present invention is shown in FIG. 4, wherein the piston 11 includes a main body 15 formed of an aluminum alloy, a metal material member 16 formed of a cast iron, for example, which is threadedly connected to the upper end of the main body 15 to define the cavity 12, as well as a sintered ceramic body 17 of silicon nitride integrally joined to the metal material member 16 to form the upper surface of the piston 11, whose thickness amounts to 10 mm. On the other hand, the cylinder liner 2 as a whole is formed of a cast iron. That region of the cylinder liner 2, which is situated above the piston top ring 13a at the top dead center position of the piston 11, is provided with a generally annular sintered ceramic body 3 of partially stabilized zirconia, having a thickness of 3 mm. Furthermore, the lower surface of the cylinder head 21 is provided with a zirconia coated layer 26.

In this embodiment, the impinging area of the injected fuel spray 25 is formed within the cavity 12 which is defined by the metal material member 16, so that it is possible to effectively prevent the combustion region of such area from being excessively heated. Moreover, the presence of the sintered ceramic bodies 3, 17 and zirconia layer 26 on the combustion chamber inner wall, except the cavity 12, makes it possible to maintain the combustion chamber inner wall, except the cavity wall, at a high temperature, and to achieve significantly increased power output and reduced fuel consumption, as well as effective clarification of the exhaust gas, including the minimization of the NOx emission.

Figure 5:
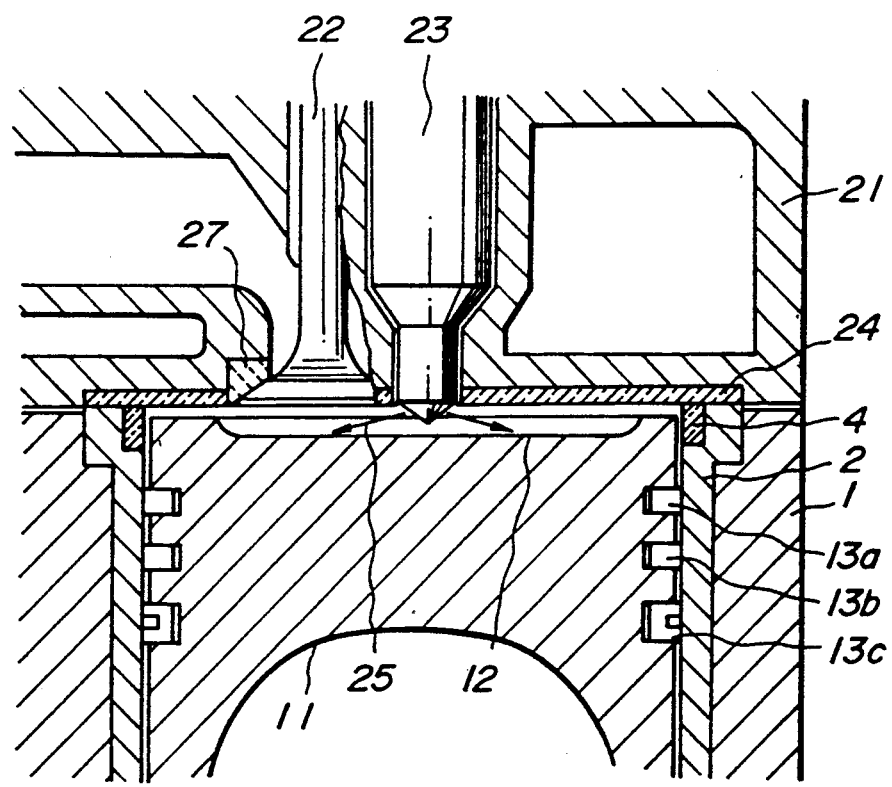

A fourth embodiment of the present invention is shown in FIG. 5, wherein the piston 11 as a whole consists essentially of an aluminum alloy, and has a piston head which is formed with a very shallow cavity 12. Thus, the cavity 12 has impinging areas of the injected fuel spray 25, which are formed of the aluminum alloy of the piston 11 itself. On the other hand, the cylinder liner 2 as a whole is formed of cast iron, and has an upper portion which is situated above the piston top ring 13a at the top dead center position of the piston 11. Such upper portion of the cylinder liner 2 is formed at least partly of a sintered ceramic body 4 of partially stabilized zirconia with an axial length of 10 mm, as measured from the upper end of the cylinder liner 2. Furthermore, the lower surface of the cylinder head 21, except the intake and exhaust valves 22, the valve seat 27 and the fuel injection nozzle 23, is formed of a sintered ceramic body 24 of partially stabilized zirconia.

By this embodiment, use of an aluminum alloy to form the impinging areas in the cavity 12 impinged upon by the injected fuel spray 25 serves to effectively prevent the combustion region of those areas from being excessively heated. Moreover, due to the provision of the sintered ceramic bodies 4, 24 to form part of the combustion chamber inner wall, except the wall of the cavity 12, such inner wall can be maintained at a relatively high temperature during the operation of the engine. Consequently, as in the previous embodiments, it is possible to achieve an increased power output and a reduced fuel consumption of the engine, as well as an improved exhaust gas clarification including the minimization of the of NOx emission.

A fifth embodiment of the present invention is shown in FIG. 6, wherein a sintered ceramic body 38 of silicon nitride is arranged to form the piston head upper surface of the piston 11 which, per se, is formed of cast iron, and also to form part of the wall of the cavity 12. The cast iron of the piston 11 is exposed on the major part of the wall of the cavity 12. The cylinder liner 2 as a whole is formed of cast iron, and has an upper portion which is formed at least partly of a sintered ceramic body 5 of partially stabilized zirconia. This ceramic body 5 is situated above the piston top ring 13a at the top dead center position of the piston 11. The cylinder head 21 is formed of cast iron, and has its lower surface which is provided with a sintered ceramic body 24 of silicon carbide. Furthermore, heat insulating air layers 33, 36, 28a, 28b are arranged between these sintered ceramic bodies 38, 5, 24 and the respective cast iron members 11, 2, 21 to effectively prevent undesirable heat transfer from the combustion chamber inner wall, except the wall of the cavity 12.

By this embodiment also, use of metallic material to form the fuel-impinging areas prevents the combustion region of those areas from being excessively heated. Moreover, suppression of the heat transfer from the combustion chamber inner wall by the heat insulating air layers 33, 36, 28a, 28b, in conjunction with the provision of the sintered ceramic bodies 38, 5, 24 to form part of the combustion chamber inner wall, serves to maintain the inner wall, except the inner wall of the cavity 12, at a relatively high temperature during the operation of the engine. Thus, it is possible to realize increased power output and reduced fuel consumption of the engine, as well as improved exhaust gas clarification including minimization of the NOx emission. These advantages can also be achieved in the same manner when, instead of sintered ceramics, the members 38, 5, 24 are formed of stainless steel, nickel- or cobalt-based super-alloy, or other suitable heat resisting metals, such as heat resisting cast steel.

A sixth embodiment of the present invention is shown in FIGS. 7A and 7B, wherein the cylinder head 21 as a whole is formed of cast iron, and is provided with a zirconia coated layer 26 to form part of the lower surface. The cylinder liner 2 as a whole is formed of cast iron, and has an upper portion provided with a chromium oxide coated layer 6 which is situated above the piston top ring 13a at the top dead center position of the piston 11. On the other hand, as particularly shown in FIG. 7B, the piston 11 as a whole is formed of an aluminum alloy, and has a piston head whose top surface is divided into a peripheral portion 34 including the fuel-impinging areas 19a–19d, and a central portion on the inner side of the fuel-impinging areas. The peripheral portion 34 is formed of the aluminum alloy of the piston 11 itself, while the central portion is provided with a zirconia coated layer 18. Furthermore, the outer peripheral surface of the piston top land has an upper portion provided with a zirconia coated layer 41 which is situated above the piston top ring 13a.

By this embodiment, since the fuel spray 25 injected from the fuel injection nozzle 23 impinges upon the areas 19a–19d on the peripheral portion 34 of the piston head top surface which are formed of aluminum alloy, the combustion regions of these impinging areas 19a–19d are effectively prevented from being excessively heated. Moreover, provision of the chromium oxide coated layer 6 and the zirconia coated layers 18, 26, 41, both formed by flame-spray process, serves to maintain the combustion chamber inner wall, except the fuel-impinging areas 19a–19d, at a relatively high temperature during the operation of the engine. Thus, with this embodiment also, it is possible to realize increased power output and reduced fuel consumption of the engine, as well as improved exhaust gas clarification including minimization of the NOx emission.

A seventh embodiment of the present invention is shown in FIG. 8, wherein the cylinder head 21 as a whole is formed of cast iron, and has a lower surface which is provided with a zirconia coated layer 26. The cylinder liner 2 as a whole is formed of silicon nitride, and has an inner peripheral surface which is provided with a chromium oxide coated layer 6. Provision of such chromium oxide coated layer 6 serves to reduce the sliding resistance of the cylinder liner 2, as compared with the bare sliding surface of the silicon nitride itself, and also to improve the heat resistivity of the combustion chamber inner wall. In the present embodiment, furthermore, the piston 11 as a whole is formed of an aluminum alloy, and has a piston head whose top surface is formed with a cavity 12. The top surface of the piston head is provided with a zirconia coated layer 20. The outer peripheral surface of the piston top land, which is situated above the piston top ring 13a of the piston 11, is provided with a zirconia coated layer 41. The cavity 12 has inner wall areas 20a, 20b which are directly impinged upon by the injected fuel spray 25, and which are formed of the aluminum alloy of the piston 11 itself. The remaining inner wall area of the cavity 12 is provided with a zirconia coated layer 35.

By this embodiment, use of the aluminum alloy to form the fuel-impinging areas 20a, 20b serves to effectively prevent the combustion regions of these areas from being excessively heated. Moreover, provision of the zirconia coated layers 20, 26, 35, 41 and chromium oxide coated layer 6 on the combustion chamber inner wall, both formed by flame-spray process, serves to improve the heat resistivity of the inner wall, whereby the inner wall can be maintained at a relatively high temperature during the operation of the engine. Thus, it is possible to achieve various advantages explained with reference to the previous embodiments.

An eighth embodiment of the present invention is shown in FIG. 9, wherein the piston 11 as a whole is formed of an aluminum alloy. The cylinder liner 2 as a whole is formed of cast iron, and has an upper portion provided with a sintered ceramic body 5 of partially stabilized zirconia. This ceramic body 5 is situated above the piston top ring 13a at the top dead center position of the piston 11. The cylinder head 21 as a whole is formed of cast iron, and has a lower surface which is covered by a sintered ceramic body 24 of silicon nitride. The combustion chamber inner wall is formed by the outer surface of the piston 11, and the surfaces of the above-mentioned ceramic bodies 5, 24. Furthermore, between the lower surface of the cylinder head 21 and the sintered ceramic body 24 of the silicon nitride, there is arranged a sintered ceramic body 37 of partially stabilized zirconia as a heat insulating member to prevent heat dissipation from the cylinder head 21. The inner wall of the cavity 12 in the top surface of the piston 11, including areas impinged upon by the injected fuel spray 25, is formed by the aluminum alloy of the piston 11 itself.

By this embodiment, the fuel impinging areas of the combustion chamber are formed of aluminum alloy, and the combustion regions of these areas are thus prevented from being excessively heated. Moreover, the above-mentioned provision of the sintered ceramic bodies 5, 24, 37 not only serves to improve the heat resistivity of the combustion chamber inner wall, except the wall of the cavity 12, but also effectively prevents heat transfer from such inner wall. Hence, the combustion chamber inner wall, except the wall of the cavity 12, can be maintained at a relatively high temperature during the operation of the engine. Consequently, it is possible to achieve increased power output and reduced fuel consumption of the engine, as well as effective clarification of the exhaust gas, including the minimization of NOx emission.

FIGS. 10A to 10E are graphs showing various characteristics of the combustion chamber according to the embodiment of FIG. 9, as contrasted with two kinds of comparative combustion chambers, all of which have been applied to a naturally aspirated, direct-injection type four cycles diesel engine with a displacement of 1,850 cc for one cylinder. Here, the combustion chamber of FIG. 9 has inner wall, wherein 40% of the total surface area except the cavity inner wall is formed by ceramic members. The first comparative chamber is made entirely of metallic members, and has exactly the same configuration as the combustion chamber of FIG. 9. The second comparative chamber is essentially the same as the first, except that the top surface of the piston, including the cavity, is formed of a sintered ceramic body which is silicon nitride. In these graphs, the marks ○, Δ and x denote the data respectively obtained by the first comparative chamber, by the chamber of the present invention, and by the second comparative chamber.

More particularly, FIGS. 10A to 10C depict various data of combustion characteristics of each engine at the rated engine speed, with the fuel injection amount in the full-load condition being expressed as 100%. The depicted data are expressed as the difference from that obtained by the first comparative chamber in its full-load condition. For the combustion chamber of the present invention, there can be recognized a decrease in the fuel consumption (FIG. 10A) as a result of increased power output of the engine, as well as a simultaneous decrease in the NOx concentration (FIG. 10C). Although the exhaust gas smoke concentration for the combustion chamber of the present invention exhibits a tendency of decrease, when compared with the data for the first comparative chamber whose inner walls are completely formed of metallic members, such density remains substantially on the same level as compared with the data for the second comparative chamber whose piston head top surface is formed of a ceramic member (FIG. 10B). Nevertheless, the improved combustion characteristics achieved by the present invention are clear in that the second comparative chamber, whose cavity wall is formed of a sintered ceramic body, provides increased fuel consumption and NOx concentration, both as compared with the first comparative chamber.

On the other hand, FIGS. 10D and 10E depict the combustion characteristics of each engine based on original data which were obtained for various fuel injection timings under the full-load condition and at the same revolutional speed of the engine, and which were then non-dimensionalized by the data obtained under a predetermined fuel injection timing for the first comparative chamber whose inner walls are completely formed of metallic members. The non-dimensionalized data are shown with reference to the NOx concentration. Comparing the fuel consumption (FIG. 10D) and the exhaust gas smoke concentration (FIG. 10E), both under the same NOx concentration, it is clear that reduction of the fuel consumption and an improved exhaust gas clarification can be effectively achieved by the present invention.

The inventors have further confirmed that these advantages can be achieved even more significantly, as the combustion chamber inner wall has a surface area ratio of the heat-resisting material which is as high as 70% or more.

A ninth embodiment of the present invention is shown in FIG. 11, wherein the cylinder head 21 as a whole is formed of cast iron, and has a lower surface covered by a sintered ceramic body 24 of partially stabilized zirconia. The cylinder liner 2 as a whole is formed of cast iron, and has an upper portion which is formed of sintered ceramic body 5 of partially stabilized zirconia, and which is situated above the piston top ring 13a at the top dead center position of the piston 11. The piston 11 as a whole is formed of aluminum alloy, and has its top surface provided with a sintered ceramic body 38 of silicon nitride. This ceramic body 38 forms part of the cavity 12, and has an inner peripheral lip portion 39 for promoting the squish of the intake air into the cavity 12. The outer peripheral surface of the piston top land, which is situated above the piston top ring 13a, is formed of a sintered ceramic body 40 of partially stabilized zirconia.

By this embodiment, the areas impinged upon by the injected fuel spray 25 are formed by the aluminum alloy of the piston 11 itself, and the combustion regions of these areas are thus prevented from being excessively heated. Moreover, provision of the ceramic bodies 5, 24, 38, 40 to form the combustion chamber inner wall, except the wall of the cavity 12, serves to maintain such inner wall at a relatively high temperature during the operation of the engine. Consequently, as in the previous embodiments, it is possible to achieve increased power output and reduced fuel consumption of the engine, as well as an effective exhaust gas clarification including the minimization of NOx emission. These advantages can be achieved even more significantly, since the intake air can be efficiently squeezed into the cavity by means of the lip portion 39.

It will be readily appreciated from the foregoing detailed description that, in accordance with the present invention, the combustion chamber for diesel engines has an inner wall of which the fuel-impinging areas are formed of a metallic material, and are thus adapted to be maintained at a relatively lower temperature as contrasted with conventional arrangement wherein ceramic material or the like heat resisting material is used to form the fuel-impinging areas. This results in that the combustion region, which is formed by the injected fuel as it impinges upon the combustion chamber inner wall, can also be maintained at a relatively low temperature. Additionally, part of the heat generated by the initial combustion of the fuel can be transferred from the metallic material portion of the combustion chamber inner wall. Consequently, the above-mentioned combustion region can be prevented from being excessively heated whereby the NOx emission in the exhaust gas can be minimized.

Furthermore, the above-mentioned arrangement of the present invention is advantageous also in that an adequate period of the ignition delay time can be maintained, during which the fuel can be efficiently mixed with oxygen to achieve an adequate initial combustion. On the other hand, use of the heat-resisting material such as ceramic matrial or the like to form at least part of the remaining area of the combustion chamber inner wall makes it possible to maintain such remaining area at a relatively high temperature, thereby to achieve an adequate main combustion of the fuel within a reduced period, as compared with the conventional arrangement in which such area is formed of metallic material. Consequently, it is possible to realize increased power output and decreased fuel consumption of the engine, as well as improved exhaust gas clarification.

While the present invention has been explained in detail with respect to the illustrated specific embodiments, it is of course that the present invention is not limited to these embodiments, and various modifications or alternations may be made without departing from the scope of the invention.

For example, the cavity in the piston head, which has been shown as being of circular contour, may have a different configuration. Also, in the above-mentioned embodiments, the heat-resisting material used to form part of the combustion chamber inner wall may be a heat-resisting metallic material, instead of ceramic material, with a sufficient heat resistivity to effectively maintain at least a portion of the inner wall, except the cavity wall and/or fuel impinging areas at a relatively high temperature during operation of the engine. Moreover, it is apparent that the metallic material other than cast iron and aluminum alloy may be used to form the piston, cylinder liner and/or cylinder head of the engine.

What is claimed is:

1. A combustion chamber for a diesel engine, comprising:
    an inner wall comprising
        (a) a fuel impinging area upon which fuel is directly injected, said fuel impinging area comprising a top surface of a piston head and an inner wall of a cavity formed in said piston head, and consisting essentially of a thermally conductive metallic member, and
        (b) a remaining area which is shielded from direct injection of fuel and which at least partially consists of a heat-resisting material, said remaining area comprising a first layer of heat-resisting material arranged beneath a lower surface of a cylinder head; and
    a sintered ceramic body consisting of partially stabilized zirconia arranged between said lower surface of said cylinder head and said first layer of heat-resisting material;
    wherein that portion of said combustion chamber inner wall which is formed of said heat-resisting material has a surface area ratio of at least 40% with respect to a total surface area of said combustion chamber inner wall except a surface area of said cavity.

2. The combustion chamber of claim 1, wherein said surface area ratio of said heat-resisting material portion is at least 70%.

3. The combustion chamber of claim 1, wherein said remaining area further comprises a top surface of a piston head, which at least partially consists of said heat-resisting material.

4. The combustion chamber of claim 1, wherein said remaining area further comprises an inner surface of a cylinder liner, which at least partially consists of said heat-resisting material.

5. The combustion chamber of claim 4, wherein that portion of said cylinder liner which is formed of said heat-resisting material has an axial length of at least 5 mm as measured from a top end of said cylinder liner.

6. The combustion chamber of claim 1, wherein said sintered ceramic body has a heat conductivity which is not greater than 0.02 cal/cm.s.°C.

7. The combustion chamber of claim 1, wherein said heat-resisting material is at least partially surrounded by a heat-insulating air layer.

8. The combustion chamber of claim 1, wherein said heat-resisting material comprises at least one member selected from the group consisting of ceramic material and heat-resisting metal.

9. The combustion chamber of claim 8, wherein said ceramic material comprises at least one member selected from the group consisting of a sintered ceramic body and a ceramic coated layer.

10. The combustion chamber of claim 9, wherein said sintered ceramic body comprises at least one member selected from the group consisting of partially stabilized zirconia mullite, silicon nitride, sialon, alumina, and silicon carbide.

11. The combustion chamber of claim 9, wherein said ceramic coated layer comprises at least one member selected from the group consisting of zirconia, chromium oxide, mullite, silicon nitride, sialon, alumina, and silicon carbide.

12. The combustion chamber of claim 8, wherein said heat-resisting metal comprises at least one member selected from the group consisting of stainless steel, nickel-based super-alloy, cobalt-based super-alloy, and heat resisting cast steel.

13. The combustion chamber of claim 1, wherein said chamber is for a naturally aspirated diesel engine.

14. A combustion chamber for a diesel engine, comprising:
an inner wall comprising:
(a) a fuel impinging area upon which fuel is directly injected, said fuel impinging area comprising a top surface of a piston head and an inner wall of a cavity formed in said piston head, and consisting essentially of a thermally conductive metallic member, and
(b) a remaining area which is shielded from direct injection of fuel and which at least partially consists of a heat-resisting material, said remaining area comprising a first layer of heat-resisting material arranged beneath a lower surface of a cylinder head and arranged on at least a portion of an outer peripheral surface of a piston top land; and
a sintered ceramic body consisting of partially stabilized zirconia arranged between said lower surface of said cylinder head and said first layer of heat-resisting material;
wherein that portion of said combustion chamber inner wall which is formed of said heat-resisting material has a surface area ratio of at least 40% with respect to a total surface area of said combustion chamber inner wall except a surface area of said cavity.

15. The combustion chamber of claim 14, wherein said remaining area further comprises a top surface of a piston head, which at least partially consists of said heat-resisting material.

16. The combustion chamber of claim 14, wherein said remaining area further comprises an inner surface of a cylinder liner, which at least partially consists of said heat-resisting material.

17. The combustion chamber of claim 14, wherein said heat-resisting material is at least partially surrounded by a heat-insulating air layer.

18. The combustion chamber of claim 14, wherein said ceramic sintered body has a heat conductivity which is not greater than 0.02 cal/cm.s.°C.

19. The combustion chamber of claim 14, wherein said heat-resisting material comprises at least one member selected from the group consisting of ceramic material and heat-resisting metal.

* * * * *